Figure 1:
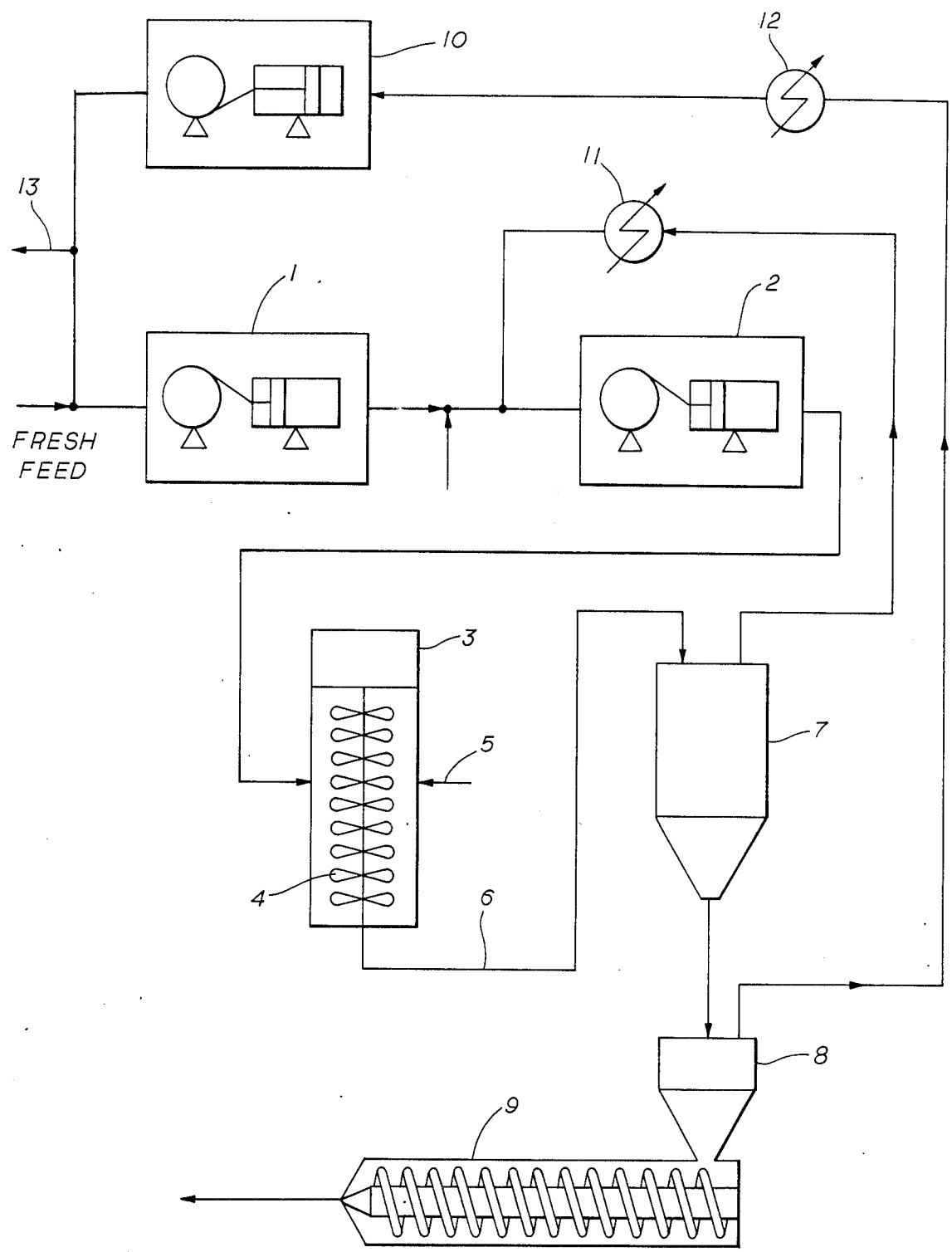

United States Patent [19]

Aliani et al.

[11] Patent Number: 4,613,632
[45] Date of Patent: * Sep. 23, 1986

[54] ETHYLENE COPOLYMERS FOR HOT MELT SYSTEMS

[75] Inventors: Giorgio Aliani, Waterloo; Jacques B. Lechat, Wezembeek-Oppem; Jozef A. F. Smits, Berchem, all of Belgium

[73] Assignee: Exxon Research & Engineering Co., Florham Park, N.J.

[*] Notice: The portion of the term of this patent subsequent to Feb. 5, 2002 has been disclaimed.

[21] Appl. No.: 697,305

[22] Filed: Feb. 1, 1985

Related U.S. Application Data

[62] Division of Ser. No. 429,481, Sep. 30, 1982, Pat. No. 4,497,941.

[30] Foreign Application Priority Data

Oct. 16, 1981 [GB] United Kingdom ............... 8131337

[51] Int. Cl.[4] .................... F21D 7/22; C08F 218/02
[52] U.S. Cl. .................... 523/172; 524/69; 524/77; 524/272; 524/474; 524/563; 524/187; 524/270; 526/331
[58] Field of Search .................. 524/69, 77, 272, 474, 524/563; 523/172; 526/331

[56] References Cited

U.S. PATENT DOCUMENTS

| | | | |
|---|---|---|---|
| 3,448,178 | 6/1969 | Flanagan | 260/897 |
| 3,657,171 | 4/1972 | White | 260/27 |
| 3,673,141 | 6/1972 | Trieschmann et al. | 524/69 |
| 3,692,723 | 9/1972 | Kasagi et al. | 526/331 |
| 3,758,431 | 9/1973 | Taft et al. | 524/563 |
| 3,821,144 | 6/1974 | Goyer et al. | 524/69 |
| 3,896,069 | 7/1975 | Kosaka et al. | 524/69 |
| 3,900,439 | 8/1975 | Kay | 524/69 |
| 3,914,489 | 10/1975 | Smedberg | 428/97 |
| 3,926,878 | 12/1975 | Shimizu et al. | 260/27 EV |
| 4,105,611 | 8/1978 | Orth | 524/272 |
| 4,197,227 | 4/1980 | Zeliger | 524/272 |
| 4,239,563 | 12/1980 | Iacovello | 526/331 |
| 4,260,722 | 4/1981 | Pfleger | 526/331 |
| 4,283,317 | 8/1981 | Murphy et al. | 260/27 R |
| 4,301,050 | 11/1981 | Masuda et al. | 523/172 |
| 4,358,557 | 11/1982 | Boggs | 524/272 |
| 4,367,113 | 1/1983 | Karim et al. | 524/187 |
| 4,497,941 | 2/1985 | Aliani et al. | 526/331 |

FOREIGN PATENT DOCUMENTS

| | | |
|---|---|---|
| 1345620 | 1/1974 | United Kingdom . |
| 1462628 | 1/1977 | United Kingdom . |
| 1485253 | 9/1977 | United Kingdom . |

OTHER PUBLICATIONS

Encyclopedia of Polymer Science & Technology, Interscience (1967) vol. 6, pp. 411-416.

*Primary Examiner*—Herbert S. Cockeram
*Attorney, Agent, or Firm*—John F. Hunt

[57] ABSTRACT

Ethylene-vinyl acetate copolymers having a melt index of 2,000 to 7,500 and containing from 10 to 22% vinyl acetate are useful in hot melt road marking compositions containing from 1 to 30% of the EVA copolymer; from 0 to 29% by weight of a binder resin; and from 0 to 5% by weight of a plasticizer, the balance of the composition typically comprising from 70 to 80% by weight of aggregates, made up of particulate materials such as sand and/or fillers and/or pigments such as calcium carbonate and titanium dioxide.

3 Claims, 1 Drawing Figure

ETHYLENE COPOLYMERS FOR HOT MELT SYSTEMS

This is a division of application Ser. No. 429,481 filed 9-30-82 now U.S. Pat. No. 4,497,941.

This invention concerns ethylene copolymers for hot melt systems, and in particular to copolymers having relatively high melt indices which may be used in binary hot melt adhesive compositions.

The term "hot melt system" is used to refer to applications in which compositions ("hot melt compositions") are applied to a substrate in a molten state, the composition developing the specific final properties for which it was formulated on cooling. Hot melt systems include hot melt adhesives, hot melt pressure sensitive adhesives, hot melt coatings, hot melt laminating compositions and hot melt roadmarking compositions.

For example, hot melt adhesives are compositions which are normally solid at ambient temperatures, and become tacky in their molten state. Materials to be bonded are joined with the molten adhesive which sets when it cools to form a strong adhesive bond. Such hot melt adhesives (for convenience referred to as "HMA") are used in a wide variety of applications such as in packaging, assembly and sanitary applications.

One conventional form of HMA is based on a ternary composition comprising:

(a) high molecular weight ethylene-vinyl acetate copolymer;
(b) a resin; and
(c) a wax.

The ethylene-vinyl acetate copolymer (which term will be abbreviated herein to "EVA") is the "backbone" polymer for HMA and other hot melt compositions, and contributes to the mechanical and adhesive properties of such compositions. Conventional EVA used in such applications is characterized by a melt index of 550 or less as measured by the standard method ASTM D1238. The resin component (b), which is normally chosen from a wide range of natural and synthetic resins, functions as a tackifier and also assists wetting. The wax component (c) is present to reduce viscosity since high viscosities mean that application temperatures are raised to get an adhesive to flow, and this may result in unwanted thermal degradation. The wax also acts as an extender and a wetting agent and in some compositions as a set time improver. For many applications it is necessary to employ a relatively expensive synthetic wax to achieve a desired combination of properties. "Encyclopaedia of Polymer Science and Technology", Interscience, 1967, 6, p411–416, discusses the use of EVA in wax-based hot melt systems and summarises the effect on adhesive properties of using EVAs of differing vinyl acetate content and melt index, showing trends for commercially available EVAs with a melt index in the range of 3 to 450, with a single EVA having a melt index over 1000, Allied Chemical product AC-400. The article states that lower melt index indicates improved toughness, better barrier properties in creased sections, higher viscosity and better hot tack properties. Other hot melt compositions containing waxes are known. G.B. Pat. No. 1 462 628 describes the high pressure production of ethylene-vinyl acetate-isobutylene terpolymers containing 18 to 28% by weight vinyl acetate and 0.5 to 3% by weight isobutylene and having a melt index of at least 150, preferably from 150 to 550, and their use in hot melt coating compositions with a wax. U.S. Pat. No. 2 877 196 discloses EVA/petroleum wax blends in which the EVA has a melt index of from 0.5 to 1000 as compositions for surface coating. CA 742287 describes similar EVA/wax blends containing a high molecular weight EVA component with a melt index below 80 and a low molecular weight component having a vinyl acetate content between 10% and 20%, an average molecular weight between 1000 and 5000, melt viscosity at 300° F. (149° C.) between 50 and 600 centipoises (50–600 mPa.s), inherent viscosity (0.25% toluene solution at 30° C.) between 0.1 and 0.3 and softening point (ring and ball) between 190° F. and 210° F. (88° C.–99° C.).

Some wax-free compositions have been described containing an EVA and a tackifier resin, but these compositions are based on known, low melt index EVA which results in a viscous composition only suitable for high temperature operation when there is a danger of degradation.

Swedish Pat. No. 346553 discloses an adhesive melt comprising an ethylene vinyl acetate and either a styrene-diene copolymer resin or a thermoplastic resin; Japanese Patent Publication 51-149327 discloses a binary composition of an EVA having melt index of 15 to 450 in conjunction with a resin derived from $C_5$ and $C_9$ naphtha fractions and having a low cyclopentadiene and dicylopentadiene content. Japanese Patent Publication 53-147733 describes a HMA intended for extrusion coating based on an EVA plus a tackifier, but teaches the addition of a second EVA to produce the appropriate properties in the composition. Only low melt index EVAs are disclosed. U.S. Pat. No. 3,448,178 discloses HMA compositions containing EVA with a high molecular weight of 200,000 to 500,000 in conjunction with a phenolic, modified terpene resin. U.S. Pat. No. 3,914,489 discloses an ethylene/vinyl ester copolymer having a melt index of 2 to 100 in conjunction with a resin having specific physical characteristics to give the composition high tensile strength. U.S. Pat. No. 3,926,878 concerns hot melt compositions containing a specific hydrogenated aromatic petroleum resin in conjunction with an EVA having a melt index of 1 to 400. An article by Duncan and Bergerhouse, "Adhesives Age" March 1980, pp 37–41, describes hot melt pressure sensitive adhesive compositions containing a tackifier and an ethylene/vinyl acetate copolymer having 19–60% vinyl acetate; the highest melt index disclosed is 150.

To reduce viscosity of the EVA/resin mixtures based on conventional, low melt index EVAs, it is usual to add a wax as described in the prior art mentioned above. Other modifiers have been employed in hot melt compositions.

U.S. Pat. No. 4,283,317 describes wax-free hot melt adhesive compositions based on an -olefin copolymer and a tall oil rosin and containing a hydrocarbon oil. G.B. Pat. No. 1 485 253 describes hot melt compositions comprising an EVA having 10 to 45 wt % vinyl acetate and 1 to 1000 g/10 min melt index and/or a rubber together with a low molecular weight propylene-ethylene copolymer.

Binary compositions based on relatively low molecular weight polyethylene homopolymers have been proposed, and are described, for example, in G.B. Pat. No. 1 345 620, but such polyethylene-based HMA compositions have been found to have poor adhesion.

A new class of ethylene/vinyl acetate copolymers has now been found with a higher melt index than those conventionally employed in hot melt systems, and these are useful in a variety of hot melt applications.

EVA as used in conventional hot melt compositions generally has a melt index below 1000, and most usually below 550. Very high melt index EVA is also known. "Encyclopaedia of Polymer Science and Technology" discloses AC-400 as an EVA with melt index of "over 1000" suggesting that this parameter had not been precisely measured. As described hereinafter in the Examples, the melt index of this commercially available EVA has been measured as 23500, and it is thus effectively a synthetic wax, differing from normal synthetic waxes in that it is a copolymer rather than a polyethylene homopolymer.

G.B. Pat. No. 1 260 486 discloses AC-400 as an auxiliary polymer in a coating composition in addition to the film-forming copolymer and AC-400 is described therein as a "polyethylene wax containing vinyl acetate". GB No. 1 233 797 discloses a hot melt adhesive composition containing AC-400 with a particular combination of rosin esters, the composition displays cold tack—that is, adhesive properties at room temperatures—which makes the composition highly unsuitable for many hot melt applications and leads to problems in handling the composition. U.S. Pat. No. 3,368,991 describes transfer inks containing waxy EVA containing 10 to 30% vinyl acetate and having an average molecular weight between 1000 and 5000. These waxy copolymers have a kinematic viscosity at 140° C. of from 50 to 2000 centipoises (50–2000 mPa.s) and a melt index very greatly in excess of 1000, the correlation being given as 1000 melt index roughly equivalent to 11000 centipoises (11000 in mPa.s), indicating that the waxy copolymers have a melt index of many thousands. A further class of EVA having very low molecular weight and thus very high melt index is used as additives for petroleum fractions, for example as described in G.B. Pat. No. 1 374 051. Typically such polymers are of such low molecular weight that the melt index is virtually immeasurably high. EP 3489 describes an EVA additive having 22 to 36% vinyl acetate and a melt index of 50 to 1000.

It has now been found that certain EVAs of a new class having a melt index intermediate the EVAs conventionally used in hot melts and the waxy EVAs, have remarkable properties which make them useful in hot melt systems where they may replace both conventional backbone and viscosity-modifying components.

Accordingly, in one aspect this invention provides a wax-free hot melt composition comprising a base polymer component and a tackifier, in which the base polymer component consists essentially of at least one ethylene-vinyl acetate copolymer having a vinyl acetate content of from 11 to 40% by weight (based on the copolymer) and a melt index of from 700 to 10000. Melt index is expressed herein in units of gms/10 mins as measured by ASTM D1238 and all references to melt indices of EVAs in connection with the invention are to be construed accordingly.

The invention further provides for the use of an EVA having a vinyl acetate content of from 11 to 40% by weight and a melt index of from 700 to 10000 in a wax-free hot melt system.

The EVA employed in the wax-free composition and system defined above has, by virtue of its melt index, a viscosity in excess of 2000 mPa.s at 140° C.

By the term "wax-free" as used herein it is meant that the system or composition contains substantially no viscosity-modifying, natural or synthetic wax in addition to the defined EVA and tackifier component. The system or composition is thus substantially free, inter alia, of paraffin waxes, microwaxes and synthetic waxes such as low molecular weight ethylene homopolymers and copolymers including high melt index (greater than 10,000 melt index) EVAs or hydrocarbon waxes produced by the Fischer-Tropsch process.

Certain of the EVAs defined above not only belong to a new class of polymers in terms of their use in wax-free hot melt applications, but are themselves novel polymers. In a further aspect therefore this invention provides an ethylene vinyl acetate copolymer having a vinyl acetate content of 11% to 40% by weight (based on the copolymer) and a melt index of from 1000 to 10000.

The invention also extends to the use of these novel EVAs in hot melt systems with a tackifier, and optionally with one or more additional polymer components and/or waxes, and to hot melt compositions comprising the novel EVA and a tackifier.

The EVA preferably has a vinyl acetate content of from 11 to 24% by weight, more preferably 11 to 22% by weight. Within these preferred range there are, however, certain narrower ranges of VA content which make the EVA particularly suited for certain end-uses. Tests conducted with EVAs having vinyl acetate in the range of from 12 to 16% by weight have shown particularly promising results in general purpose HMA, hot melt laminating and hot melt roadmarking. For bookbinding using HMA with a slightly higher VA content of from 14 to 24% is preferred.

The EVAs of the invention have relatively higher melt indices than is conventional for hot melt EVAs yet lower melt index than EVAs used as fuel additives. It is preferred for the melt index of the EVAs to be in the range of 800 to 7500, more preferably 1000 to 6000, but again within the range the optimum melt index is determined by the intended end-use. For HMA in general, a melt index of 2000 to 4500, particularly 2500 to 4000, is preferred, whereas for bookbinding HMA a melt index of 1000 to 1500, particularly 1000 to 1200, is preferred. For hot melt roadmarking a melt index of 2500 to 6000 is preferred.

By choosing EVAs with both vinyl acetate content and melt index characteristics within the preferred ranges for a particular end-use it is possible to optimize the properties of the EVA for that end-use. The trends in behaviour with variation in melt index and VA content are demonstrated in more detail hereinafter in the Examples. However, a particularly surprising aspect of the invention is the general applicability of EVA having a vinyl acetate content of 12 to 16% and a melt index of from 2000 to 5000.

The EVAs of the invention may be used in hot melt systems in a variety of compositions. For some applications the EVA alone may have sufficient tack in the molten state to be used alone as a hot melt composition, without addition of any tackifier, although possibly with small amounts of additives such as antioxidants which are conventional in hot melt compositions. The EVAs may also be used in conventional compositions in conjunction with a tackifier, and optionally a wax, to replace the conventional EVA, either totally or in part. A great advantage of the invention, however, lies in the use of the EVAs of the invention to replace both the conventional polymer component and the viscosity modifier component of hot melt composition; the resulting wax-free compositions not only have the advantage of avoiding the need for wax or other viscosity modifiers, but also show improved performance over compositions using conventional EVA or other polymers.

The tackifier employed in such wax-free hot melt compositions may be a natural or a synthetic resin. Among the natural resins which may be employed are the polyterpenes, rosins, rosin esters and derivatives, as well as their hydrogenated forms. Various synthetic petroleum resins may be employed, and suitable resins include products obtained by thermal or catalytic polymerization of aliphatic (including cyclic olefins) and/or aromatic hydrocarbons and hydrogenated derivatives thereof, as well as mixtures of such resins. By way of example, the so-called aliphatic resins may be obtained by polymerization of $C_5$ naphtha fractions containing $C_5$ conjugated diolefins such as isoprene, 1,3-pentadiene or mixtures thereof, or these fractions with other components such as cyclopentadiene, methyl cyclopentadiene or their dimes or codimes. Optionally these resins may be hydrogenated. The so-called aromatic resins may be obtained by polymerizing a petroleum fraction containing polymerizable aromatic hydrocarbons such as styrene, -methylstyrene, vinyl toluene, vinyl xylene, propenyl benzene, indene, methyl indene and ethyl indene, and optionally hydrogenating the resultant resin. Other chemically modified resins may also be used —for example, modification with, —unsaturated acid or anhydride. Examples of other resins include mixed aliphatic/aromatic resins and modified terpene resins such as phenolic modified terpene resins.

The detailed formulation of the hot melt compositions will be determined by its intended end-use. The compositions of the inventions have been formed to be particularly suited to hot melt adhesive applications.

The wax-free hot melt adhesive compositions of the invention may desirably contain the EVA and tackifier in a weight ratio of from 95:5 to 5:95. A high proportion of EVA tends to result in high viscosity, better cohesive strength, better tensile strength and better cold flexibility, whereas high resin contents tend to enhance adhesion and wetting.

Preferably the weight ratio of EVA to tackifier is in the range of from 95:5 to 50:50, and most preferably the binary compositions contain from 50 to 70% by weight of the composition of EVA. However, it is a feature of the wax-free compositions that the properties do not vary as significantly as in conventional ternary compositions with varying ratios of EVA and tackifier. Thus, while ternary compositions are frequently formulated for particular applications within relatively narrow ranges of EVA, wax and tackifier content, the wax-free compositions of the invention show much greater flexibility, as well as greater predictability in terms of their behaviour and performance.

As already indicated the binary compositions have low viscosity without having to resort to the addition of waxes. The viscosity chosen for a conventional HMA depends on its intended application. By way of example, conventional HMA compositions intended for packaging applications are formulated to give a viscosity 500 to 3000 mPa.s (at 180° C.), while for bookbinding a viscosity of 3000 to 10,000 mPa.s (at 180° C.) is generally more appropriate. It is a feature of the wax-free compositions of the present invention that the overall viscosity is low enough to give the HMA acceptable handling properties, without resulting in an undesirable reduction in other properties.

The binary compositions also show generally greater adhesive strength over a wide range of substrates. The thermal stability of the compositions is also excellent.

In many applications of HMA it is highly desirable for the HMA when molten to remain capable of sticking for a relatively long period to enable the materials to be bonded to be correctly positioned. That is to say, the "open-time"—the time available from applying molten HMA to the substrates to be bonded until the substrates are brought together—should be long. At the same time, the "setting time"—the time from bringing the substrates together until the bond is set—should be short. Previously, formulations with long open time tended to have long setting times and vice versa. It is a particular feature for the present invention that it is possible to formulate wax-free which combine a long open time and a short setting time.

For particular applications, it may be appropriate for the wax-free hot melt adhesive compositions of the invention to contain other components common in HMA formulation. Thus, for example, the compositions may also contain other polymers, anti-oxidants, plasticizers, fillers and flow improvers.

HMAs prepared in accordance with this invention may be used to bond a variety of substrates including metals such as aluminium, polyolefins such as polyethylene and polypropylene, other polymers such as polyvinylchloride, polyamides and polyesters, paper, textiles, treated and untreated cardboard and wood. The HMAs are useful in a wide range of applications such as wood-working, bookbinding, sanitary goods, assembly (including do-it-yourself and electronics applications) and packaging.

The invention is also applicable to methods and compositions for hot melt coating and laminating. Conventionally, a hot melt coating formulation contains a polymer, a resin and a wax, a typical composition comprising 25% EVA, 25% resin and 50% wax. According to the invention some, or preferably all, of the wax and some, or preferably all, of the EVA component may be replaced by the EVAs of the invention. It is believed that a binary, wax-free hot melt coating composition according to the invention may offer advantages such as better adhesion, better crease resistance, improved low temperature flexibility, and improved appearance in terms of gloss and clarity, depending upon the particular formulation employed. Preferably a hot melt coating composition of the invention comprises 50 to 80% by weight EVA and 20 to 50% by weight resin, a particularly advantageous composition comprising 70% by weight EVA and 30% by weight resin. A particularly suitable EVA for such a composition has from 12 to 16% vinyl acetate and a melt index of from 2000 to 4500, preferably from 2500 to 4000. Such compositions comprise a valuable combination of adhesion, mechanical properties, flexibility and setting time.

Conventional laminating adhesives are based on bitumen, polyurethane, wax blends, atactic polypropylene blends or polyethylene (applied by extrusion). The EVAs of the invention may be used with advantage as additives for wax blend or bitumen adhesives. However, the ability of the EVAs of the invention to provide high adhesion with good flexibility, especially at low temperatures, makes them especially suited for lamination. A wax-free composition of the invention particularly suited for laminating comprises from 70 to 80% by weight EVA and from 20 to 30% by weight resin, and a preferred EVA for this application has from 12 to 16% vinyl acetate and a melt index of from 2000 to 4500.

The above described hot melt coating and laminating compositions may also contain other components conventional to that type of formulation such as anti-oxidants and fillers.

A further type of hot melt system where the invention has particular applicability is in hot melt roadmarking compositions. Conventionally such hot melt roadmarking compositions comprise a binder resin such as a rosin-modified resin, a hydrocarbon resin or cumarone-indene resin, typically having a softening point of from 70 to 125° C., a plasticizer such as a vegetable or mineral oil, a modified alkyd or polybutene, and a variety of fillers and pigments. It has now been found possible to replace some or all of the resin and some or all of the oil component in such formulations by EVA according to the invention.

The resulting formulations have been found to have improved high temperature resistance and low temperature flexibility. Thus, in a further preferred aspect of the invention there is provided a hot melt roadmarking composition, and a method of roadmarking using such a composition, which composition comprises:
  (a) from 1 to 30% by weight of an EVA having from 10 to 22% by weight, preferably 11 to 16% by weight, of vinyl acetate and a melt index of from 2000 to 7500, more preferably 2500 to 7000;
  (b) from 0 to 29% by weight of a binder resin; and
  (c) from 0 to 5% by weight of a plasticizer, the balance of the composition typically comprising from 70 to 80% by weight of aggregates, made up of particulate materials such as sand and/or fillers and/or pigments such as calcium carbonate and titanium dioxide.

A preferred composition comprises:
  (a) from 5 to 15% by weight EVA;
  (b) from 5 to 15% by weight of a binder resin;
  (c) from 0 to 5% by weight of a plasticizer; and
  (d) from 70 to 80% by weight of aggregate.

The EVAs of the invention may also be used as asphalt additives. Thus, asphalt compositions comprising bitumen and aggregate materials may be modified by the addition of the EVA. Other possible applications for the EVAs of the invention include mould release agents, colour masterbatch additives, paper impregnation, can and cap seals, pipe wrapping, optical fibre coating, paint and printing ink additives, toners, plastics additives, wax blending, plastisols, fruit coating agents and rubber processing aids.

The EVA of the present invention is conveniently prepared by a high pressure polymerization process in which ethylene and an appropriate amount of vinyl acetate are polymerized at a temperature not greater than 320° C. and at a pressure of 300 to 3000 kg/cm$^2$, optionally in the presence of an appropriate amount of a chain transfer agent, to give the desired melt index to the EVA product.

The polymerization may be effected in a conventional autoclave or tubular reactor. The reaction temperature is normally between 130 and 250° C. and is preferably from 145° to 230° C. The lower the reaction pressure the higher the output of the polymerization reaction but at the expense of higher consumption of chain transfer agent and initiator. Thus, the preferred pressure range is from 450 to 2100 kg/cm$^2$, more preferably from 600 to 1850 kg/cm$^2$. The particular conditions are chosen having regard to the product required.

The chain transfer agent or modifier may be introduced into the reaction vessel to adjust the melt index of the product. The amount of chain transfer agent used therefore depends on the agent chosen and the final melt index sought, as well as the reaction conditions employed and vinyl acetate content since the latter acts as a chain transfer agent itself. Typically the amount of chain transfer agent will be from 0 to 25% of the reactor feed. The use of chain transfer agents is well known, and given the requirements specified herein for the melt index of the EVA it is believed to be within the competence of one skilled in the art to determine a suitable agent and rate of addition empirically. By way of illustration it may be said that suitable agents include those with $C_s$ values (measured at 1360 atmosphere and 130° C. for homopolymerization of ethylene) of up to 1.0 and include hydrogen, acetone, butyraldehyde, cyclohexanone, butene-1, propylene, butane and isobutylene. $C_s$ values of up to 0.1 are preferred. It has been found that isobutylene is a convenient chain transfer agent.

It is to be noted that in some instances there will be incorporation of the chain transfer agent into the EVA copolymer. For example, when isobutylene is employed the product will be effectively an ethylene/vinyl acetate/isobutylene terpolymer. As used herein, the terms "EVA", "EVA copolymer" and "ethylene vinyl acetate copolymer" include polymers containing such additional comonomers.

As an alternative to using a chain transfer agent, it has been found possible to prepare certain EVAs of the invention by operating at lower pressures of preferably 300 to 1000 kg/cm$^2$.

The polymerization will usually be initiated by a free radical catalyst such as a peroxide. Also conventional additives such as antioxidants and carriers for the catalyst may be present according to conventional practice.

The invention will now be described in more detail, though only by way of illustration, with reference to the accompanying drawing which is a schematic block diagram of an apparatus for preparing an EVA of the invention.

Ethylene is introduced at 45 kg/cm$^2$ into compressor 1 where it is compressed to about 150 kg/cm$^2$, then vinyl acetate and chain transfer agent are added and the combined feed is further compressed in compressor 2 to approximately 1550 kg/cm$^2$. The high pressure feed is then introduced into autoclave 3 fitted with stirrer 4. A free radical catalyst is introduced via line 5 and at separate points on the autoclave (not shown). The autoclave 3 may be cooled or heated as appropriate to maintain the desired reaction temperature.

The formed polymer, together with unreacted material and impurities is taken via line 6 to a high pressure separator 7. Unreacted monomer separated off are recycled via heat exchanger 11 to compressor 2. The remainder of the output is fed to low pressure separator 8, from which EVA is collected and fed to extruder, 9 where it is formed into pellets. The unpolymerized material separated at 8 is fed via heat exchanger 12 to a small compressor 10. Impurities are separated off in a purge 13, and unreacted monomers are recycled to compressor 1.

The following Examples and Tests are now given, though again only by way of illustration, to show certain aspects of the invention and its evaluation in more detail.

EXAMPLE 1

Preparation of EVA

An apparatus as described hereinbefore in relation to the drawing was operated under the following conditions:

Reactor pressure = 1560 kg/cm$^2$
Reactor temperature = 188° C.
Feed temperature = 48° C.
Catalyst: 20% solution of t-butyl perpivalate in isododecane
Antioxidant: butylhydroxytoluene
Chain transfer agent: isobutylene.

The feed rates, and rates of introduction of catalyst, additive and chain transfer agent were selected to give consumption at the following rates (per ton of EVA produced):

Ethylene: 800 kg/ton
Vinyl acetate: 187 kg/ton
Isobutylene: 90.0 kg/ton
Antioxidant: 0.96 kg/ton
Catalyst: 4.8 kg/ton.

The product obtained is an ethylene/vinyl acetate copolymer containing 14% by weight vinyl acetate and incorporated isobutylene (estimated as comprising 7.5% by weight of the copolymer) and having a melt index of 2300.

EXAMPLES 2 to 6

Preparation of binary HMA compositions

Binary hot melt adhesive compositions were prepared using the EVA prepared in Example 1, in conjunction with Escorez 2203, a petroleum resin available from Exxon Chemical Company which comprises the product of a Friedel-Craft catalysed polymerization of a C$_5$ naphtha fraction to which are added C$_5$ branched olefins and styrene. Table 1 below gives the proportions of the EVA and resin in the binary compositions. In addition, to each composition was added 0.5% (based on the weight of the total composition) of Irganox 1076, a phenolic antioxidant available from Ciba-Geigy.

TABLE 1

| Example | EVA (% by wt.) | Resin (% by wt.) |
| --- | --- | --- |
| 2 | 90 | 10 |
| 3 | 85 | 15 |
| 4 | 80 | 20 |
| 5 | 70 | 30 |
| 6 | 60 | 40 |

COMPARATIVE EXAMPLES A-H:

Conventional HMA compositions

To provide a comparison ternary compositions were prepared from conventional EVAs, Escorez 2203 and Multiwax ML445, the latter being a microwax available from Witco Chemical Company. Table 2 gives details of the ternary compositions prepared. Also shown are binary compositions prepared from Epolene C$_{10}$ and Epolene C$_{15}$, two low molecular weight polyolefins available from Eastman Kodak, and from AC-400 an EVA wax commercially available from Allied Chemical Company. The melt index of AC-400 was measured by the procedure of ASTM D1238 and was found to be 23500.

TABLE 2

| Example | Polymer Type | Amount (% by wt.) | Resin (% by wt.) | Wax (% by wt.) |
| --- | --- | --- | --- | --- |
| A | EVA (28% VA M.I. = 25) | 35 | 35 | 30 |
| B | EVA (28% VA M.I. = 400) | 35 | 35 | 30 |
| C | EVA (28% VA M.I. = 25) | 45 | 45 | 10 |
| D | EVA (28% VA M.I. = 25) + EVA (33% VA M.I. = 45) | 25 + 20 | 45 | 10 |
| E | Epolene C$_{10}$ | 70 | 30 | — |
| F | Epolene C$_{15}$ | 70 | 30 | — |
| G | AC-400 (14–16% VA, MI = 23500) | 60 | 40 | — |
| H | AC-400 | 70 | 30 | — |

Test Results

The compositions of Examples 2 to 6 and Comparative Examples A to H were compared in the following series of test.

| Test | Measurement |
| --- | --- |
| Cloud Point (AMS 360-22) | °C. |
| Viscosity at 180° C. (ASTM D3236) | mPa·s |
| Viscosity stability - viscosity after 50 hours at 180° C. (ASTM D3236) | mPa·s |
| Colour in molten state (ASTM D1544) | Gardner No. |
| Colour stability after 25 and 50 hours at 180° C. (molten state) | Gardner No. |
| Skinning after 50 hours at 180° C. | % of surface skinned |
| Tensile strength at break point (ASTM D638) | g/mm$^2$ |
| Elongation at break (ASTM D638) | % |
| Open time at 180° C. (measured on Olinger machine at 5 kg/cm$^2$ pressure) | secs. |
| Setting time at 180° C. (measured on Olinger machine at 5 kg/cm$^2$ pressure) | secs. |
| T-peel on polyethylene (PE) aluminium (Al) polypropylene (PP) (ASTM D1876) | g/cm |
| Hot shear at 40/60/80° C. (see below for procedure) | hours |
| Low temperature performance (see below for procedure) | °C. |
| Loss of weight at 180° C. for 3 hours | % |
| Appearance ⎫<br>Stringing ⎭ | Visual check |

The results obtained are shown in Table 3, which demonstrate the advantages of the invention.

Hot Shear Test

Test strips were prepared by laminating the hot melt adhesive between sheet of polyethylene. The test strips were cut to ½ inch (12.7 mm) width and had a shear contact area of ½ inch × ½ inch (12.7 mm × 12.7 mm).

The test strips were then placed in an oven at the test temperature and a shear load of 0.5 kg was applied. The time for the HMA bond to fail was measured.

Low Temperature Performance

Sheets of the HMA under test were prepared with a thickness of 0.9 mm. Test strips ½ inch×5 inches (12.7 mm×127 mm) were cut from the sheets. The test strips were then arranged in a flex tester (a device in which the test strips may be bent around a metal cylinder 3 cms in diameter) and the tester with the test strips was then cooled to the test temperature in a freezing compartment.

After 16 hours the flex tester was operated to bend the strips through 180° around the cylinder in 15 seconds.

The temperature of any broken test strips was measured.

The test was started at a temperature of −9° C. and repeated at temperatures reduced in 3° C. intervals. For each HMA the result recorded is the temperature of which the test strip failed.

T-Peel

The laminated samples for carrying out the test according to ASTM D1876 were prepared by sandwiching a layer of adhesive between sheets of the substrate to be tested in a hot process for 45 seconds. Temperatures used were:

| aluminium | 150° C. |
| PE | 110° C. |
| PP | 150° C. |

The samples produced has a thickness of approximately 150 m.

TABLE 3

| Composition | A | B | C | D | E | F | G | H |
|---|---|---|---|---|---|---|---|---|
| Cloud Point, °C. | 88 | 70 | 95 | 118 | 84 | 82 | 85 | 88 |
| Colour Gardner | 10 | 10 | 11 | 11 | 11 | 10 | | |
| Appearance | Hazy | Hazy | Hazy | Hazy | ± Clear | Clear | | |
| Viscosity mPa·s at 180° C. | 2750 | 500 | 12400 | 10400 | 1275 | 875 | 190 | 220 |
| Heat Stability | | | | | | | | |
| Colour (25 hrs at 180° C.) | 16 | 14 | 14 | 14 | 13 | 14 | | |
| Colour (50 hrs at 180° C.) | >17 | >17 | 17 | 17 | 14 | 17 | | |
| Viscosity (50 hrs at 180° C.) | 2450 | 480 | 11750 | 10400 | 1325 | 900 | | |
| Viscosity change, % | −11 | −4 | −5 | 0 | +4 | +3 | | |
| Skinning, % | 25 | No | 75 | 100 | 75 | 25 | | |
| Tensile at break, g/mm$^2$ | 204 | 155 | 465 | 386 | 264 | 261 | 234 | 249 |
| Elongation at break, % | 720 | 75 | 785 | 920 | 174 | 104 | 34 | 37 |
| Cold flexibility, °C. | −21 | −17 | −23 | <−25 | −13 | −21 | −13 | −17 |
| Open time sec. at 180° C. | 9 | 9 | 17 | 15 | 7 | 13 | 15 | 18 |
| Setting time sec. at 180° C. | 1 | 1.5 | 1 | 1 | 2 | 1 | 1 | 1 |
| T-Peel g/cm: | | | | | | | | |
| PE/PE | 1000 ± 200 | 1200 ± 200 | 575 ± 250 | 160 ± 30 | 850 ± 150 | 300 ± 150 | 260 | 180 |
| AL/AL | 270 ± 80 | 380 ± 50 | 300 ± 100 | 380 ± 120 | 250 ± 50 | 220 ± 100 | 270 | 255 |
| PP/PP | 500 ± 250 | 520 ± 100 | 520 ± 100 | 450 ± 100 | 160 ± 60 | 180 ± 30 | | |
| Hot shear hours at | | | | | | | | |
| 40° C. | >70 | >70 | >70 | >70 | — | — | | |
| 60° C. | 2.3 | 0.5 | 10 | 3.4 | — | — | | |
| 80° C. | 0 | 0 | 0 | 0 | — | — | | |
| Weight loss 3 hrs. at 180° C. | 1.4 | 1.1 | 1.3 | 1.3 | 1.1 | 0.8 | | |
| Stringing, % | Yes | No | Yes | Yes | No | Little | | |

| Composition | 2 | 3 | 4 | 5 | 6 |
|---|---|---|---|---|---|
| Cloud Point, °C. | 73 | 71 | 70 | 65 | 58 |
| Colour Gardner | 6 | 8 | 8 | 10 | 11 |
| Appearance | Hazy | Clear | Clear | Clear | Clear |
| Viscosity mPa·s at 180° C. | 2750 | 2400 | 2100 | 1500 | 1100 |
| Heat Stability | | | | | |
| Colour (25 hrs at 180° C.) | 13 | 13 | 13 | 16 | 16 |
| Colour (50 hrs at 180° C.) | 14 | 14 | 14 | 17 | 17 |
| Viscosity (50 hrs at 180° C.) | 2800 | 2450 | 2100 | 1575 | 1125 |
| Viscosity change, % | +2 | +2 | 0 | +5 | +2 |
| Skinning, % | 10 | 10 | 75 | 50 | 100 |
| Tensile at break, g/mm$^2$ | 234 | 217 | 198 | 144 | 139 |
| Elongation at break, % | 88 | 91 | 99 | 157 | 213 |
| Cold flexibility, °C. | −25 | −25 | −23 | −23 | −20 |
| Open time sec. at 180° C. | 7 | 9 | 13 | 15 | 15 |
| Setting time sec. at 180° C. | 2 | 2 | 1.5 | 1 | 1 |
| T-Peel g/cm: | | | | | |
| PE/PE | 1200 ± 200 | 1100 ± 250 | 1250 ± 250 | 1225 ± 300 | 1375 ± 375 |
| AL/AL | 360 ± 70 | 390 ± 50 | 420 ± 50 | 520 ± 50 | 550 ± 80 |
| PP/PP | 190 ± 30 | 230 ± 50 | 240 ± 50 | 280 ± 50 | 300 ± 100 |
| Hot shear hours at | | | | | |
| 40° C. | >70 | — | — | >70 | — |
| 60° C. | >45 | — | — | 42 | — |
| 80° C. | 5 min | — | — | 0 | — |
| Weight loss 3 hrs. at 180° C. | 1.0 | 1.1 | 1.1 | 1.4 | 1.6 |
| Stringing, % | Little | Little | Little | Little | Little |

EXAMPLES 7-14

Preparation of EVA

Using a similar procedure to that described in Example 1, but varying the reactor conditions and the nature and amount of chain transfer agent, a variety of EVAs for use in the invention were prepared. The conditions employed and the products obtained are set out in Table 4 below.

TABLE 4

| Example | Reactor pressure (kg/cm$^2$) | Reactor temp (°C.) | Chain transfer agent (wt %) | Product VA (%) | MI |
|---|---|---|---|---|---|
| 7 | 1740 | 145 | Isobutylene 2% | 12 | 875 |
| 8 | 1740 | 145 | Isobutylene 13% | 14.2 | 2900 |
| 9 | 680 | 230 | Isobutylene 0.1% | 22.5 | 6600 |
| 10 | 730 | 230 | None | 22.5 | 3360 |
| 11 | 610 | 230 | Isobutylene 0.3% | 10.2 | 6800 |
| 12 | 1100 | 215 | Isobutylene 0.9% | 25.8 | 925 |
| 13 | 650 | 230 | Isobutylene 0.2% | 24.5 | 5400 |
| 14 | 1850 | 170 | Isobutylene 2% | 29 | 700 |

COMPARATIVE EXAMPLES J:

Preparation of EVA

To provide a comparison, EVA having a VA content outside the range specified for the invention were prepared. The properties of this product and the conditions for preparing it are set out in Table 5 below.

TABLE 5

| Comparative Example | Reactor pressure (kg/cm$^2$) | Reactor temp (°C.) | Chain transfer agent (wt %) | Product VA (%) | MI |
|---|---|---|---|---|---|
| J | 1740 | 145 | Isobutylene 2% | 5.5 | 735 |

EXAMPLE 15

Preparation of EVA

The procedure of Example 1 was repeated but with the following modified conditions:
Reactor pressure = 1740 kg/cm$^2$
Reactor temperature = 145° C.
The remaining reactor conditions were the same and isobutylene was used as modifier, but at of concentration of 15-16 wt %. The products obtained were EVAs containing 14 wt % vinyl acetate and having a melt index in the range 4000 to 6000 with isobutylene incorporation.

Test Results

Comparison with Comparative Example J and conventional wax-containing compositions The products of Example 7-14 were tested in hot melt compositions of the invention and compared to wax-free compositions prepared using the EVA of Comparative Example J. To provide a comparison with conventional ternary (wax-containing) compositions the following reference compositions were also tested.

| Reference | (parts by weight) | | |
|---|---|---|---|
| | I | II | III |
| EVA - 28% VA MI 25 | — | — | 45 |
| EVA - 28% VA MI 400 | 33 | 33 | — |
| Escorez 2203 | 33 | 33 | 45 |
| Paraffin (65° C. MP) | 33 | — | — |
| Hard microwax* | — | 33 | — |
| Soft microwax** | — | — | 10 |
| Irganox 1076 | ←—0.5—→ | | |

*Multiwax 180 MH from Witco Chemical
**Multiwax ML 445 from Witco Chemical

Comparison of Reference I with Reference II shows the effect of using expensive hard microwax, which is unnecessary according to the invention. Reference III is formulated for better mechanical properties but has poorer adhesion and cold flexibility.

The wax-free compositions to be tested were formulated with Escorez 2203 and 0.5% Irganox 1076, in weight ratios (EVA:resin) of 60:40, 70:30 and 90:10 using the following procedure:

Formulation

The Irganox 1076 inhibitor, half the EVA and half the resin were added under a nitrogen blanket to a 1 liter sigma-blade mixer at 175° C. and mixing was commenced. The remaining EVA and resin was then added in increment over 5 to 10 minutes. After 90 minutes mixing the formulation was removed and cooled under a nitrogen blanket.

Testing

The test procedures described hereinbefore were employed, with the exception that the setting and open times were measured with the clinger apparatus at 1.5 kg/cm$^2$. The samples for the T-peel test were prepared using spacers between the sheets of substrate under test to ensure a uniform 150 m sample thickness. The hot press was used to melt the adhesive composition for 2 minutes, then light pressure was applied for 4 minutes to press the sheets of substrate together to give the sample thickness set by the spacers. The press temperatures were:
PE 90° C.
Aluminium 150° C.
The results are given in Table 6 below.

TABLE 6

| | EVA of Example | | | | | | | | | | | |
|---|---|---|---|---|---|---|---|---|---|---|---|---|
| | 7 | | | 8 | | | 9 | | | 10 | | |
| | EVA:Escorez 2203 | | | | | | | | | | | |
| Composition | 60:40 | 70:30 | 90:10 | 60:40 | 70:30 | 90:10 | 60:40 | 70:30 | 90:10 | 60:40 | 70:30 | 90:10 |
| Cloud Point, °C. | 115 | 120 | 78 | 80 | 85 | 74 | 80 | 70 | <70 | 72 | 72 | <70 |
| Colour Gardner | 9 | 6.5 | 5 | 9 | 9 | 6 | 10 | 9 | 6 | 10 | 9 | 6 |
| Appearance | Clear | Clear | Clear | Clear | Clear | Clear | Clear | Clear | Clear | Clear | Clear | Clear |
| Viscosity mPa·s at 180° C. | 2775 | 4100 | 8100 | 962 | 1312 | 2300 | 510 | 665 | 1062 | 825 | 1087 | 1925 |
| Heat Stability | | | | | | | | | | | | |
| Colour (50 hrs at 180° C.) | 15 | 15 | 11 | >17 | 18 | 12 | >17 | 17 | 13 | >17 | 17 | 13 |
| Viscosity (50 hrs at 180° C.) | 2780 | 4020 | 7940 | 965 | 1340 | 2320 | 525 | 680 | 1062 | 840 | 1087 | 1900 |
| Viscosity change, % | +0.2 | −2 | −2 | 0 | +2 | +1 | +2.9 | +2.2 | 0 | +1.8 | 0 | −1.2 |
| Skinning, % | 90 | 100 | No | 50 | 50 | No | 25 | 50 | 25 | 100 | 100 | 100 |
| Tensile at break, g/mm$^2$ | 229 | 251 | 311 | 153 | 147 | 221 | 71 | 78 | 99 | 91 | 98 | 146 |
| Elongation at break, % | 732 | 587 | 390 | 232 | 102 | 61 | 117 | 92 | 33 | 165 | 135 | 67 |
| Cold flexibility, °C. | −12.5 | −22.5 | <−29.5 | −17.5 | −22.5 | −29.5 | −15 | −15 | −10 | −17 | −20 | −15 |
| Open time sec. at 180° C. | 17 | 12 | 11 | 32 | 9 | 13 | 50 | 50 | 42 | 38 | 43 | 35 |
| Setting time sec. at 180° C. | 0.6 | 0.7 | 0.8 | 0.8 | 0.8 | 0.8 | 2.5 | 2.5 | 2 | 4 | 2.5 | 1.5 |

TABLE 6-continued

| T-Peel g/cm: | | | | | | | | | | | | | |
|---|---|---|---|---|---|---|---|---|---|---|---|---|---|
| PE/PE | 140 | 110 | 35 | 1375 | 1075 | 250 | 700 | 400 | 100 | 850 | 600 | 350 | |
| AL/AL | 400 | 750 | 500 | 750 | 600 | 250 | 800 | 560 | 250 | 900 | 775 | 450 | |
| Weight loss 3 hrs. at 180° C. | 1.2 | 0.9 | 0.3 | 1.2 | 1.0 | 0.3 | 1.2 | 1.0 | 0.6 | 1.5 | 1.2 | 0.5 | |
| Stringing | Little | Little | Little | Little | Little | Little | Little slightly tacky | No very slightly tacky | No | Little very slightly tacky | No | No | |

| | EVA of Example | | | | | | | | | | | | |
|---|---|---|---|---|---|---|---|---|---|---|---|---|---|
| | 11 | | | J | | | 12 | | | 13 | | | 14 |
| | | | | | | EVA: Escorez 2203 | | | | | | | |
| Composition | 60:40 | 70:30 | 90:10 | 60:40 | 70:30 | 90:10 | 60:40 | 70:30 | 90:10 | 60:40 | 70:30 | 90:10 | 60:40 | 70:30 |
| Cloud Point, °C. | 78 | 80 | 80 | 90 | 86 | 91 | 200 | 200 | <70 | 120 | 120 | <70 | >250 | >250 |
| Colour Gardner | 9 | 9 | 7 | 9 | 9 | 6 | 9 | 8 | 6 | 10 | 8 | 6 | 7 | 6 |
| Appearance | Clear | Clear | slight haze | Clear | Clear | Clear | Clear | Clear | Clear | Clear | Clear | Clear | Clear | Clear |
| Viscosity mPa·s at 180° C. | 475 | 600 | 962 | 3200 | 4800 | 9700 | 2325 | 3450 | 6900 | 560 | 700 | 1175 | 3450 | 5200 |
| Heat Stability | | | | | | | | | | | | | | |
| Colour (50 hrs at 180° C.) | >17 | 17 | 12 | 16 | 14 | 11 | 16 | 15 | 13 | >17 | >17 | 13 | 14 | 13.5 |
| Viscosity (50 hrs at 180° C.) | 490 | 620 | 950 | 3210 | 4880 | 9680 | 2350 | 3500 | 6950 | 570 | 730 | 1175 | 3430 | 5100 |
| Viscosity change, % | +3.2 | +3.3 | −1.3 | +0.3 | +2 | 0 | +1.1 | +1.4 | 0.7 | +1.8 | +4.3 | 0 | −0.6 | −1.9 |
| Skinning, % | No | No | No | 90 | 75 | No | 100 | 90 | 100 | 50 | 75 | 100 | 50 | 90 |
| Tensile at break, g/mm$^2$ | 156 | 168 | 245 | 392 | 404 | 487 | 125 | 134 | 171 | 47 | 45 | 58 | 95 | 106 |
| Elongation at break, % | 177 | 99 | 20 | 155 | 227 | 194 | 497 | 423 | 226 | 65 | 88 | 44 | 679 | 543 |
| Cold flexibility, °C. | −12.5 | −15 | −25 | −10 | −15 | −29.5 | −22.5 −25 | <−28 | too tacky | — | −15 | −25 | −27.5 | |
| Open time sec. at 180° C. | 27 | 23 | 19 | 13 | 11 | 6 | 48 | 32 | 17 | >100 | 70 | 55 | >60 | 65 |
| Setting time sec. at 180° C. | 0.6 | 0.5 | 0.9 | 0.3 | 0.4 | 0.5 | 2 | 1.5 | 1.5 | 14 | 9 | 5 | 5 | 4 |
| T-Peel g/cm: | | | | | | | | | | | | | | |
| PE/PE | 27 | 240 | 100 | 25 | 40 | 40 | 1125 | 1100 | 125 | 370 | 265 | 100 | 1125 | 480 |
| AL/AL | 800 | 650 | 175 | 100 | 400 | 170 | 875 | 950 | 750 | 650 | 430 | 280 | 900 | 1100 |
| Weight loss 3 hrs. at 180° C. | 1.8 | 1.1 | 0.5 | 1.2 | 1.0 | 0.4 | 1.1 | 1.0 | 0.4 | 1.9 | 1.3 | 0.7 | — | — |
| Stringing | No slightly brittle | No | No | No brittle | No slightly brittle | No | No | No | No | No tacky | No tacky | No sticky | No slightly tacky | Little slightly tacky |

| Composition | Reference I | Reference II | Reference III |
|---|---|---|---|
| Cloud Point, °C. | | | |
| Colour Gardner | 10 | 11 | 11 |
| Appearance | | | |
| Viscosity mPa·s at 180° C. | 275 | 406 | 12300 |
| Heat Stability | | | |
| Colour (50 hrs at 180° C.) | 17 | >17 | 15 |
| Viscosity (50 hrs at 180° C.) | 336 | 402 | 12300 |
| Viscosity change, % | +22 | −1 | 0 |
| Skinning | No | 100 | 100 |
| Tensile at break, g/mm$^2$ | 317 | 238 | 465 |
| Elongation at break, % | 36 | 72 | 1024 |
| Cold flexibility, °C. | −17 | −17 | −20 |
| Open time sec. at 180° C. | 10 | 12 | 17 |
| Setting time sec. at 180° C. | 1.3 | 0.8 | 1 |
| T-Peel g/cm: | | | |
| PE/PE | 35 | 1500 | 675 |
| AL/AL | 400 | 600 | 50 |
| Weight loss 3 hrs. at 180° C. | — | — | — |

These results demonstrate the surprising versatility of the competitors of the invention. Compositions based on Examples 7 and (particularly) 8 show a useful combination of properties for hotmelt adhesive applications, and have acceptable viscosities without the need for a wax component. Example 8 provides compositions useful for HMA, hot melt coating and laminating. By contrast compositions based on Comparative Example J show poor adhesion and higher viscosity.

Example 11 provides an EVA which is particularly suited for hot melt roadmarking applications as shown hereinafter.

Examples 9, 10 and 13 show the effect of increasing VA content. Adhesion is still high and their longer setting times make them more suitable for assembly applications such as in do-it-yourself adhesives.

Examples 12 and 14 show that high VA content and lower melt index gives high specific adhesion with increased viscosity, and particularly good cold flexibility.

This combination of properties makes the compositions more suited for bookbinding applications.

Test Results

Use of various resins in wax-free compositions with EVA of Example 8

The EVA of Example 8 was tested in wax-free compositions of the invention with a variety of resins in a 70:30 EVA:resin wax-free blend. The results are given in the following Table 7.

The resins are identified as follows:

| | |
|---|---|
| Escorez 5300 | (Exxon Chemical Company), a hydrogenated poly-(cyclopentadiene) resin. |
| Escorez 1310 | (Exxon Chemical Company), a $C_5$ hydrocarbon resin. |
| Norsolene M1090 | (CdF Chemie), a hydrocarbon resin. |
| Arkon M100 | (Arakawa), a hydrogenated $C_9$ resin. |
| Foral 105 | (Hercules), a hydrogenated rosin ester. |
| Krystallex 100 | (Hercules), an α-methyl-styrene resin. |
| Dertophene T | (DRT), a terpene phenolic resin. |
| Wingtack 95 | (Goodyear), a $C_5$ hydrocarbon resin. |
| Superstatac 80 | (Reichold), a styrene-modified hydrocarbon resin. |
| Eastman H100 | (Eastman Kodak), a hydrogenated hydrocarbon. |
| Hercules AR100 | (Hercules), a $C_5/C_9$ hydrocarbon resin. | hot melt roadmarking composition IV which comprised:

| Component | % by wt |
|---|---|
| Resin (Escorez 1102-RM)[1] | 16 |
| Shelflex 471[2] | 4 |
| Sand and $CaCO_3$ | 71 |
| $TiO_2$ | 8 |

[1] a commercially available $C_5$ hydrocarbon resin developed for roadmarking by Exxon Chemical Company
[2] a naphthalene oil available from Shell The results given below show compositions of the invention (Examples 16 and 17) using no oil are better than conventional composition IV in all but flexibility, but this can be improved by addition of a reduced amount of oil (Example 18) which also reduces the sprayable temperature.

TABLE 8

| Example | IV | 16 | 17 | 18 |
|---|---|---|---|---|
| EVA of Example 8 | — | 10.5 | — | — |
| EVA of Example 11 | 10.5 | — | — | 5 |
| Escorez 2203 | 10.5 | 10.5 | 10.5 | 15 |
| Shelflex Oil | — | — | — | 1 |
| Aggregates (Sand/$CaCO_3$/$TiO_2$) | 79 | 79 | 79 | 79 |
| Min Temp (°C.) for 3000 mPas viscosity | 200 | 272 | 290 | 240 |
| Tacky | Yes | No | No | No |
| Flexibility | GOOD | POOR | POOR | GOOD |
| Solubility in White Spirit | UNACCEPTABLE | GOOD | GOOD | GOOD |

TABLE 7

| | Escorez 2203 | Escorez 5300 | Escorez 2101 | Escorez 1310 | Norsolene M 1090 | Arkon M 100 | Foral 105 |
|---|---|---|---|---|---|---|---|
| Physical properties | | | | | | | |
| Compatability, °C. | 85 | 66 | 65 | 70 | 250 | 135 | 70 |
| Initial Colour, Gardner | 9 | 1 | 13 | 8 | (5–6) hazy | 2 hazy | 8 |
| Viscosity at 180° C., mPas | 1312 | 1512 | 1025 | 1325 | 1525 | 1500 | 1480 |
| Heat Stability (50 hrs 180° C.) | | | | | | | |
| Colour, Gardner | 18 | 13–14 | >18 | 17 | Milky | 14 hazy | 14 hazy |
| Viscosity at 180° C., mPas | 1340 | 1560 | 1060 | 1295 | 1595 | 1538 | 1575 |
| Skinning, % | 50% thin | 10% thin | 100% med | 25% thin | No | No | 75% thin |
| Adhesive Properties | | | | | | | |
| Max open time, Sec | 32 | 40 | 35 | 36 | 23 | 19 | 26 |
| Setting time, Sec | 2 | 2 | 1.5 | 1 | 1.5 | 1.5 | 1.5 |
| T-Peel on PE, g/cm | 1075 | 950 | 1625 | 900 | 300 | 285 | 1100 |
| T-Peel on Al, g/cm | 600 | 700 | 120 | 100 | 350 | 560 | 825 |
| Mechanical Properties | | | | | | | |
| Tensile strength, g/mm$^2$ | 147 | 175 | 155 | 169 | 208 | 197 | 166 |
| Elongation, % | 102 | 87 | 262 | 123 | 97 | 115 | 200 ± 50 |
| Cold flexibility, °C. | −21.5 | −22.5 | −17.5 | −22.5 | −20 | −15 | −15 |

| | Krystallex 100 | Dertophene T | Wingtack 95 | Superstatac 80 | Eastman H 100 | Hercules AR 100 |
|---|---|---|---|---|---|---|
| Physical properties | | | | | | |
| Compatability, °C. | 250 | 66 | 71 | 65 | 67 | 92 |
| Initial Colour, Gardner | <1 hazy | 6 | 6 | 11 | 5 | 14 |
| Viscosity at 180° C., mPas | 1975 | 1362 | 1275 | 1300 | 1438 | 1487 |
| Heat Stability (50 hrs 180° C.) | | | | | | |
| Colour, Gardner | Milky 10 | 17 | 13 | 17 | 14 | >18 |
| Viscosity at 180° C., mPas | 1810 | 1445 | 1325 | 1392 | 1550 | 1587 |
| Skinning, % | No | No | 50% thin | 10% thin | 50% thin | 75% thin |
| Adhesive Properties | | | | | | |
| Max open time, Sec | 13 | 42 | 27 | 25 | 30 | 30 |
| Setting time, Sec | 1.5 | 1 | 1 | 1 | 1.5 | 1.5 |
| T-Peel on PE, g/cm | 225 | 1250 | 875 | 1025 | 975 | 230 |
| T-Peel on Al, g/cm | 150 | 800 | 550 | 875 | 725 | 700 |
| Mechanical Properties | | | | | | |
| Tensile strength, g/mm$^2$ | 196 | 160 | 185 | 158 | 180 | 196 |
| Elongation, % | 17 | 186 ± 30 | 162 | 127 | 128 ± 30 | 179 |
| Cold flexibility, °C. | −25 | −17.5 | −20 | −17.5 | −25 | — |

EXAMPLES 16–18

Hot Melt Roadmarking

Various compositions of the invention were prepared as shown in Table 8 and compared with a conventional

TABLE 8-continued

| Example | IV | 16 | 17 | 18 |
|---|---|---|---|---|
| UV resistance | ACCEPTABLE | GOOD | GOOD | GOOD |

Viscosity Measurement

A number of small samples of EVA were taken during changing polymerization conditions in the preparations described hereinbefore. These samples were analyzed to determine VA content, the melt index was measured by ASTM D-1238 and the viscosity was measured using a Brookfield viscometer at several temperatures. The results are given in Table 9 below.

This shows the EVA for use in the invention all have viscosity at 150° C. in excess of 2000 mPa.s and thus a viscosity at 140° C. considerably in excess of 2000 mPa.s.

Extrapolating from these results it is predicted that the maximum melt index of 10000 will correspond to a viscosity at 140° C. will be 2000 mPa.s.

| MI (g/10 min) | VA (%) | VISCOSITY IN mPa·s | | | |
|---|---|---|---|---|---|
| | | 140° C. | 150° C. | 180° C. | 190° C. |
| 1240 | 14 | 30025* | 23560 | | 9660 |
| 1740 | 13.2 | 13780 | 10400 | 5350 | 4440 |
| 1880 | 14 | 13600* | 10200 | | 4090 |
| 2550 | 13.5 | 9320 | 7230 | 3605 | 2940 |
| 3125 | 13.4 | 7650 | 5880 | | 2355 |
| 3300 | 18 | 7000* | 5400 | | 2250 |
| 8650 | 22 | 2550* | 1886 | | 782 |

*calculated from viscosity measured at 130° C. and 150° C.

We claim:
1. A hot melt roadmarking composition comprising:
   (a) from 1 to 30% by weight of an ethylene-vinyl acetate copolymer having from 10 to 22% by weight of vinyl acetate and a melt index of from 2000 to 7500;
   (b) from 0 to 29% by weight of a binder resin; and
   (c) from 0 to 5% by weight of a plasticizer.
2. A hot melt roadmarking composition as claimed in claim 1 comprising:
   (a) from 5 to 15% by weight of the EVA;
   (b) from 5 to 15% by weight of the binder resin;
   (c) from 0 to 5% by weight of the plasticizer; and
   (d) from 70 to 80% by weight of aggregate.
3. A hot melt roadmarking composition as claimed in claim 1, in which the EVA has from 11 to 16% by weight vinyl acetate and a melt index of from 2500 to 7000.

* * * * *